United States Patent
Hirokane et al.

(10) Patent No.: US 10,989,458 B2
(45) Date of Patent: Apr. 27, 2021

(54) COLD STORAGE UNIT, MOVING BODY, ICE SLURRY SUPPLY SYSTEM, COLD STORAGE ARTICLE TRANSPORT SYSTEM, COLD STORAGE METHOD FOR COLD STORAGE ARTICLE, AND TRANSPORT METHOD FOR COLD STORAGE ARTICLE

(71) Applicant: BLANCTEC Co., Ltd., Tokyo (JP)

(72) Inventors: Yoshio Hirokane, Tokyo (JP); Tadao Izutsu, Tokyo (JP)

(73) Assignee: BLANCTEC CO., LTD., Tokyo (JP)

( * ) Notice: Subject to any disclaimer, the term of this patent is extended or adjusted under 35 U.S.C. 154(b) by 0 days.

(21) Appl. No.: 15/777,034

(22) PCT Filed: Nov. 18, 2016

(86) PCT No.: PCT/JP2016/084322
§ 371 (c)(1),
(2) Date: May 17, 2018

(87) PCT Pub. No.: WO2017/086464
PCT Pub. Date: May 26, 2017

(65) Prior Publication Data
US 2019/0024960 A1  Jan. 24, 2019

(30) Foreign Application Priority Data

Nov. 19, 2015 (JP) .............................. JP2015-226589
Mar. 3, 2016 (JP) .............................. JP2016-041189
(Continued)

(51) Int. Cl.
*F25C 1/02* (2006.01)
*A23B 4/09* (2006.01)
(Continued)

(52) U.S. Cl.
CPC .................. *F25C 1/02* (2013.01); *A23B 4/02* (2013.01); *A23B 4/027* (2013.01); *A23B 4/06* (2013.01);
(Continued)

(58) Field of Classification Search
CPC ...... F25C 1/02; F25C 5/20; F25C 5/22; F25C 1/00; F25C 1/145; F25C 2301/002; F25D 3/06
See application file for complete search history.

(56) References Cited

U.S. PATENT DOCUMENTS 2,509,579 A   5/1950  Sharma
6,367,268 B1 * 4/2002  Paul .................... B60H 1/3235
                                                          62/330
(Continued)

FOREIGN PATENT DOCUMENTS

JP    50154446 A    12/1975
JP    54084045 A    7/1979
(Continued)

OTHER PUBLICATIONS

RU Office Action issued in the Patent Application No. RU2018121506, dated Feb. 1, 2019.
(Continued)

*Primary Examiner* — Elizabeth J Martin
(74) *Attorney, Agent, or Firm* — Muncy, Geissler, Olds and Lowe, P.C.

(57) ABSTRACT

Provided is a cold storage unit that has a high cold storage capacity, does not generate carbon dioxide, and enables recycling of the cold source. Also provided are a moving body and an ice slurry supply system. In the cold storage unit, a casing that defines a cold storage space has a heat insulating structure, a partition wall that faces the casing is provided at least at a top portion of the cold storage space, (Continued)

and a gap between the casing and the partition wall is filled with an ice slurry that is a mixture of brine and flake ice acquired by freezing the brine. In addition, it is possible to provide a supply port for supplying the ice slurry into the gap and a discharge port for discharging the ice slurry from the gap.

13 Claims, 6 Drawing Sheets

(30) Foreign Application Priority Data

| May 24, 2016 | (JP) | JP2016-103012 |
|---|---|---|
| May 24, 2016 | (JP) | JP2016-103013 |
| May 24, 2016 | (JP) | JP2016-103014 |
| May 24, 2016 | (JP) | JP2016-103637 |
| May 24, 2016 | (JP) | JP2016-103638 |
| May 24, 2016 | (JP) | JP2016-103639 |
| May 24, 2016 | (JP) | JP2016-103640 |
| Jul. 4, 2016 | (JP) | JP2016-132615 |

(51) Int. Cl.

| A23L 3/375 | (2006.01) |
|---|---|
| A23B 4/027 | (2006.01) |
| F25D 3/02 | (2006.01) |
| F25C 1/00 | (2006.01) |
| A23L 3/36 | (2006.01) |
| F25D 15/00 | (2006.01) |
| A23B 4/06 | (2006.01) |
| A23B 4/02 | (2006.01) |
| F25C 5/20 | (2018.01) |
| F25C 1/145 | (2018.01) |
| F25D 3/10 | (2006.01) |
| F25B 9/00 | (2006.01) |
| F25D 3/04 | (2006.01) |

(52) U.S. Cl.
CPC .............. *A23B 4/09* (2013.01); *A23L 3/36* (2013.01); *A23L 3/375* (2013.01); *F25B 9/002* (2013.01); *F25C 1/00* (2013.01); *F25C 1/145* (2013.01); *F25C 5/20* (2018.01); *F25C 5/22* (2018.01); *F25D 3/02* (2013.01); *F25D 3/045* (2013.01); *F25D 3/10* (2013.01); *F25D 15/00* (2013.01); *A23V 2002/00* (2013.01); *F25C 2301/002* (2013.01); *Y02A 40/963* (2018.01)

(56) References Cited

U.S. PATENT DOCUMENTS

| 6,666,030 | B2 | 12/2003 | Furuta et al. | |
|---|---|---|---|---|
| 6,793,007 | B1* | 9/2004 | Kramer | C09K 5/10 165/80.4 |
| 2013/0306904 | A1 | 11/2013 | Trujillo et al. | |
| 2015/0107292 | A1* | 4/2015 | Cousaert | F25D 3/06 62/457.2 |

FOREIGN PATENT DOCUMENTS

| JP | S61205767 A | 9/1986 |
|---|---|---|
| JP | 62003736 A | 1/1987 |
| JP | 63178786 A | 11/1988 |
| JP | 04031283 A | 2/1992 |
| JP | H06123534 A | 5/1994 |
| JP | 0656665 A | 8/1994 |
| JP | H09229525 A | 9/1997 |
| JP | 10009734 A | 1/1998 |
| JP | H10205940 A | 8/1998 |
| JP | 2000354454 A | 12/2000 |
| JP | 2001066030 A | 3/2001 |
| JP | 2002115945 A | 4/2002 |
| JP | 2002162136 A | 6/2002 |
| JP | 2003056953 A | 2/2003 |
| JP | 2004026174 A | 1/2004 |
| JP | 2005003231 A | 1/2005 |
| JP | 2006078137 A | 3/2006 |
| JP | 2006158301 A | 6/2006 |
| JP | 2006214683 A | 8/2006 |
| JP | 2006258334 A | 9/2006 |
| JP | 2007040548 A | 2/2007 |
| JP | 2007175699 A | 7/2007 |
| JP | 2008202863 A | 9/2008 |
| JP | 2011075197 A | 4/2011 |
| JP | 2013036628 A | 2/2013 |
| JP | 2014031935 A | 2/2014 |
| JP | 2014508268 A | 4/2014 |
| JP | 2014119238 A | 6/2014 |
| JP | 6234529 B2 | 11/2017 |
| RU | 2131096 C1 | 5/1999 |
| RU | 2228493 C1 | 5/2004 |
| RU | 74350 U1 | 6/2008 |
| SU | 1013710 A | 12/1981 |
| SU | 1634223 A1 | 8/1988 |
| WO | 2012104787 A1 | 8/2012 |
| WO | 2014197950 A1 | 12/2014 |

OTHER PUBLICATIONS

Decision of Refusal issued in corresponding JP Patent Application No. 2017-551959; dated Jan. 29, 2019.
Notification of Reasons for Refusal corresponding to JP Application No. 2017-551959; dated Nov. 20, 2018.
Written Opposition issued in corresponding JP Patent No. 6388420; dated Jan. 9, 2019.
Office Action and Search Report issued in the corresponding RU Patent Application No. 2018121637; dated Jan. 10, 2019.
Office Action and Search Report issued in corresponding RU Patent Application No. RU2018121638, dated Jan. 14, 2019.
Office Action and Search Report issued in corresponding RU Patent Application No. RU2018121507, dated Jan. 14, 2019.
G.H. Robertson et al., "Methodology for Direct Contact Freezing of Vegetables in Aqueous Freezing Media," USDA Western Regional Research Lab, vol. 41, 1976, pp. 845-851.
J.E. Tanner, "Observations of Rapid Freezing of Salt Solutions," American Foundation for Biological Research, 1975, pp. 353-363.
U.S. Appl. No. 15/777,025, filed May 17, 2018.
U.S. Appl. No. 15/777,012, filed May 17, 2018.
U.S. Appl. No. 15/777,021, filed May 17, 2018.
Kaisui Flake Seihyoki, [online], Iceman Corp., published on Nov. 4, 2015 (Nov. 4, 2015)< [retrieval date: Jan. 20, 2017 (Jan. 20, 2017)] URL:https://www.youtube.com/watch?v=lzmLq_rF18U, a whole article.
JP Notification of Reasons for Refusal corresponding to Application No. 2016-132615; dated Jan. 31, 2017.
The Refrigeration, Issued date Nov. 15, 2015 (Nov. 15, 2015), vol. 90, No. 1057, p. 2, lower part, 'Iceman Corp.' Kokoku.

* cited by examiner

COLD STORAGE UNIT, MOVING BODY, ICE SLURRY SUPPLY SYSTEM, COLD STORAGE ARTICLE TRANSPORT SYSTEM, COLD STORAGE METHOD FOR COLD STORAGE ARTICLE, AND TRANSPORT METHOD FOR COLD STORAGE ARTICLE

CROSS REFERENCE TO RELATED APPLICATIONS

This is the U.S. national stage of application No. PCT/JP2016/084322, filed on Nov. 18, 2016. Priority under 35 U.S.C. § 119(a) and 35 U.S.C. § 365(b) is claimed from Japanese Application No. 2015-226589, filed on Nov. 19, 2015; Japanese Application No. 2016-041189 filed Mar. 3, 2016; and Japanese Application Nos. 2016-103012, 2016-103013, and 2016-103014, filed May 24, 2016; and Japanese Application Nos. 2016-103637, 2016-103638, 2016-103639, and 2016-103640, filed May 24, 2016; and Japanese Application No. 2016-132615, filed Jul. 4, 2016; the disclosures all of which are also incorporated herein by reference.

TECHNICAL FIELD

The present invention relates to a cold storage unit, a moving body, an ice slurry supply system, a cold storage article transport system, a cold storage method for a cold storage article, and a transport method for a cold storage article.

BACKGROUND ART

Hitherto, as a cold source for a cold storage unit, various freezers are used that require a power source such as electric power and the like. However, the cold storage unit is often used all day long, and power consumption by the freezer is not preferable from the viewpoint of running cost and energy saving. In particular, a cold storage vehicle that is provided with the cold storage unit is not suitable for long-term cold storage, since they require fuel to drive a power source such as an engine. In relation to this, a technique has been disclosed (for example, see Patent Document 1) such that a cooling chamber for housing dry ice is provided on a top end side of the cold storage container (cold storage unit), and air cooled by the dry ice is blown into the cargo chamber via a blower.

Patent Document 1: Japanese Unexamined Patent Application, Publication No. 2004-26174

DISCLOSURE OF THE INVENTION

Problems to be Solved by the Invention

However, in the cold storage container using the dry ice, there is a need of forming the cooling chamber to have a sealed structure so as to prevent carbon dioxide generated by the sublimation of the dry ice from leaking into the cargo chamber, and discharging the carbon dioxide into the atmosphere via a through-hole provided to the cold storage container and/or a gap formed by eliminating a lower side packing from among packing for sealing a storage door. If there is no carbon dioxide discharge means, depending on the airtightness of the cooling chamber, there may be a case in which the cooling chamber is filled with carbon dioxide, increases in pressure, and is finally deformed. Also, since carbon dioxide is a typical greenhouse gas, to discharge the carbon dioxide generated by the sublimation of dry ice into the atmosphere is not preferable from the viewpoint of global environmental protection. Furthermore, since the dry ice cannot be recycled, there is also a disadvantage that using dry ice is costly.

The present invention has been made in view of such circumstances, and an object of the present invention is to provide a cold storage unit that has a high cold storage capacity, does not generate carbon dioxide, and can recycle a cold source. Also provided are a moving body and an ice slurry supply system.

Means for Solving the Problems

In order to achieve the above object, in accordance with an aspect of the present invention, there is provided a cold storage unit, wherein a casing that defines a cold storage space has a heat insulating structure, a partition wall that faces the casing is provided at least at a top portion of the cold storage space, and a gap between the casing and the partition wall is filled with an ice slurry that is a mixture of brine and flake ice acquired by freezing the brine.

In addition, the cold storage unit according to an aspect of the present invention can include, a supply port for supplying the ice slurry into the gap, and a discharge port for discharging the ice slurry from the gap.

In addition, the gap can house an ice slurry storage filled with the ice slurry.

In addition, the casing can be formed as a double wall interposed with a heat insulator, and a wall surface abutting the heat insulator is adhered with a heat insulation sheet for reflecting radiant heat.

In accordance with an aspect of the present invention, there is provided a moving body that can install a plurality of cold storage units.

In accordance with an aspect of the present invention, there is provided an ice slurry supply system, wherein a distribution base can be provided with an ice slurry supply equipment for supplying the ice slurry to the cold storage unit installed on the moving body.

In accordance with an aspect of the present invention, there is provided a cold storage article transport system that stores and transports a cold storage article in the cold storage unit supplied with refrigerant including flake ice acquired by freezing the brine, including, a freezing point adjusting unit for adjusting a freezing point of the brine based on a cold storage temperature required for the cold storage article, a flake ice production unit for producing the flake ice from the brine having the freezing point thereof being adjusted, and a supply amount adjusting unit for adjusting a supply amount of the generated flake ice to the cold storage unit based on a transit time required for the cold storage article.

In addition, the brine can be salt water, and the freezing point adjusting unit can adjust the freezing point of the brine supplied to the flake ice production unit by adjusting a solute concentration of the salt water.

In addition, a plurality of types of the brine each having a different freezing point can be prepared, and the freezing point adjusting unit can adjust the freezing point of the brine supplied to the flake ice production unit by selecting a predetermined type of the brine from among the plurality of types of the brine.

In addition, the refrigerant supplied to the cold storage unit can be an ice slurry that is a mixture of the flake ice and the brine.

Effects of the Invention

According to the present invention, it is possible to provide a method that can realize long-duration transportation of a cold storage article by a cold storage unit that has a high cold storage capacity, does not generate carbon dioxide, and which allows for the cooling source to be recycled.

PREFERRED MODE FOR CARRYING OUT THE INVENTION

<Ice>

Figure 1:
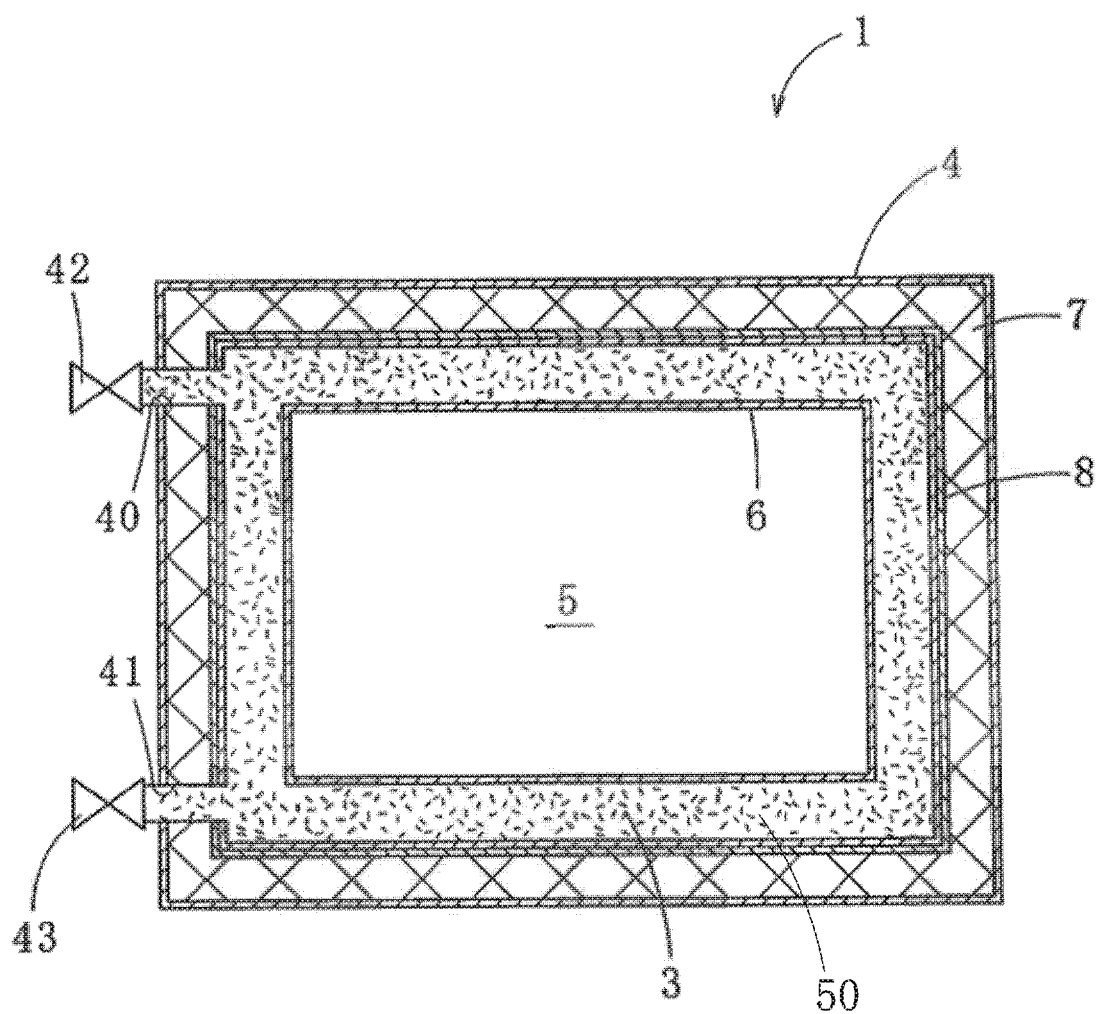
FIG. 1 is a cross-sectional view showing a configuration of a cold storage unit according to an embodiment of the present invention.

Ice used for the cold storage unit according to the present invention is an ice (also referred to as "flake ice") which satisfies the following conditions (a) and (b) and is formed from a liquid (also referred to as "brine") that includes an aqueous solution including a solute.
(a) The temperature upon complete melting of the ice is lower than 0° C.
(b) A rate of change in solute concentration of an aqueous solution to be generated from the ice in melting process is 30% or less.

It is known that solidifying point depression, in which the solidifying point of the aqueous solution decreases, occurs in a case in which a solute such as common salt is dissolved in water. By the action of solidifying point depression, the solidifying point of an aqueous solution in which a solute such as common salt is dissolved decreases. This means that ice formed from such an aqueous solution is ice which is solidified at a lower temperature than ice formed from fresh water.

Here, the heat required when ice converts to water is called "latent heat", but this latent heat is not accompanied by a temperature change. By the effect of such latent heat, the ice having a lowered solidifying point, as described above, is sustained in a stable state at a temperature equal to or lower than the solidifying point of fresh water at the time of melting and thus a state in which the cold energy is saved is sustained. Consequently, the capacity of the above-described ice to cool the cold storage object is inherently higher than that of ice formed from fresh water. However, the present inventors discovered that when ice produced by the conventional method is used to cool the cold storage object, the temperature of the ice itself rapidly increases, and therefore the cooling capacity thereof is insufficient. The present inventors investigated the reasons for this and discovered that, in the conventional method, even if the ice is from an aqueous solution including a solute such as common salt, actually a solute-free ice is produced before the aqueous solution freezes. As a result, what is produced is a mixture of the solute-free ice and the remaining solute, or otherwise only a slight amount of ice having a lowered solidifying point. Consequently, an ice having high cooling capacity has not been produced.

However, the present inventors have succeeded in producing an ice from a liquid including an aqueous solution having a decreased solidifying point by a predetermined method (described later). Such ice, which is used for the cold storage unit according to the present invention, satisfies the above described conditions (a) and (b). Hereinafter, the conditions (a) and (b) will be described.

(Temperature at the Completion of Melting)

With regard to the above (a), since the ice used for the cold storage unit according to the present invention is the ice formed from the liquid including the aqueous solution including the solute, the temperature of the solidifying point thereof is lower than that of fresh water (solute-free water). Therefore, the ice has a feature that the temperature at the completion of melting is less than 0° C. The "temperature at the completion of melting" is intended to mean the temperature of water obtained by melting the entire amount of ice used for the cold storage unit according to the present invention by leaving the ice under conditions above the melting point (such as room temperature at atmospheric pressure) to start melting.

The temperature at the completion of melting is not particularly limited as long as the temperature is below 0° C., and it can be changed as appropriate by adjusting the type and the concentration of the solute. The temperature at the completion of melting of the ice is preferably lower as the cooling capacity is higher, and specifically, the temperature is preferably $-1°$ C. or less ($-2°$ C. or less, $-3°$ C. or less, $-4°$ C. or less, $-5°$ C. or less, $-6°$ C. or less, $-7°$ C. or less, $-8°$ C. or less, $-9°$ C. or less, $-10°$ C. or less, $-11°$ C. or less, $-12°$ C. or less, $-13°$ C. or less, $-14°$ C. or less, $-15°$ C. or less, $-16°$ C. or less, $-17°$ C. or less, $-18°$ C. or less, $-19°$ C. or less, $-20°$ C. or less, or the like). Meanwhile, there is also a case in which it is preferable to bring the solidifying point closer to the freezing point of a cold storage object (such as a case for preventing damage to fresh plant and animal foodstuff). In such a case, the temperature at the completion of melting is preferably not too low, for example, $-21°$ C. or higher ($-20°$ C. or higher, $-19°$ C. or higher, $-18°$ C. or higher, $-17°$ C. or higher, $-16°$ C. or higher, $-15°$ C. or higher, $-14°$ C. or higher, $-13°$ C. or higher, $-12°$ C. or higher, $-11°$ C. or higher, $-10°$ C. or higher, $-9°$ C. or higher, $-8°$ C. or higher, $-7°$ C. or higher, $-6°$ C. or higher, $-5°$ C. or higher, $-4°$ C. or higher, $-3°$ C. or higher, $-2°$ C. or higher, $-1°$ C. or higher, $-0.5°$ C. or higher, or the like).

(Rate of Change in Solute Concentration)

With regard to the above (b), the ice used for the cold storage unit according to the present invention has a feature that the rate of change in solute concentration of the aqueous solution generated from the ice in the melting process (hereinafter, abbreviated as the "rate of change in solute concentration" in some cases in the present specification) is 30% or less. Even in the method described in Patent Document 1, there is also a case in which a small amount of ice having a decreased solidifying point is generated. However, since most of the ice is a mixture of solute-free ice and solute crystals, cooling capacity thereof is not sufficient. In the above-described case of the ice largely containing the mixture of solute-free ice and solute crystals, when the ice is placed under a melting condition, the elution rate of the solute while melting is not consistent. This means that, at a time close to the start of melting, a large amount of the solute is eluted, as the melting progresses, the elution amount decreases, and at a time close to the completion of melting, a small amount of the solute is eluted. In contrast, the ice used for the cold storage unit according to the present invention is formed from a liquid including an aqueous solution including a solute, and therefore has a feature that the change is small in elution rate of the solute in the melting process. Specifically, the rate of change in solute concentration of the aqueous solution generated from the ice in the melting process is 30%. Incidentally, the "rate of change in solute concentration of the aqueous solution generated from the ice during the melting process" is intended to mean the proportion of the concentration of the solution at the completion of melting of the ice against the solute concentration of the solution generated at an arbitrary point of time in the melting process. Incidentally, the "solute concentration" is intended to mean the mass concentration of the solute in the aqueous solution.

The rate of change in solute concentration with regard to the ice used for the cold storage unit according to the present invention is not particularly limited as long as the rate is 30% or less. However, a small rate of change in solute concentration means a high purity (i.e., a high cooling capacity) of the ice formed from the aqueous solution having the lowered solidifying point. From this viewpoint, the rate of change in solute concentration is preferably 25% or less (24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, 0.5% or less, or the like). Meanwhile, the rate of change in solute concentration may be 0.1% or more (0.5% or more, 1% or more, 2% or more, 3% or more, 4% or more, 5% or more, 6% or more, 7% or more, 8% or more, 9% or more, 10% or more, 11% or more, 12% or more, 13% or more, 14% or more, 15% or more, 16% or more, 17% or more, 18% or more, 19% or more, 20% or more, or the like).

(Solute)

The type of solute to be included in the ice used for the cold storage unit according to the present invention is not particularly limited as long as it is a solute when water is used as a solvent, and can be selected as appropriate according to the desired solidifying point, the application for which the ice is to be used, and the like. Examples of the solute may include a solid solute and a liquid solute, and examples of a typical solid solute may include salts (inorganic salts, organic salts, and the like). Particularly, among the salts, common salt (NaCl) is preferable since the temperature of solidifying point is not excessively decreased and it is suitable for cooling of fresh plants and animals or portions thereof. In addition, common salt is preferable from the viewpoint of easy procurement as well since it is included in seawater. Examples of the liquid solute may include ethylene glycol. Incidentally, the solute may be included singly, or two or more types thereof may be included.

The concentration of the solute included in the ice used for the cold storage unit according to the present invention is not particularly limited, and can be selected as appropriate according to the type of solute, the desired solidifying point, the application for which the ice is to be used, and the like. For example, in the case of using common salt as the solute, from the viewpoint of further decreasing the solidifying point of the aqueous solution and thus being able to obtain a high cooling capacity, it is preferable that the concentration of common salt is 0.5% (w/v) or more (1% (w/v) or more, 2% (w/v) or more, 3% (w/v) or more, 4% (w/v) or more, 5% (w/v) or more, 6% (w/v) or more, 7% (w/v) or more, 8% (w/v) or more, 9% (w/v) or more, 10% (w/v) or more, 11% (w/v) or more, 12% (w/v) or more, 13% (w/v) or more, 14% (w/v) or more, 15% (w/v) or more, 16% (w/v) or more, 17% (w/v) or more, 18% (w/v) or more, 19% (w/v) or more, 20% (w/v) or more, or the like). Meanwhile, it is preferable not to excessively lower the temperature of solidifying point in the case of using the ice used for the cold storage unit according to the present invention for cooling fresh plants and animals or portions thereof, and it is preferable that the concentration of common salt is 23% (w/v) or less (20% (w/v) or less, 19% (w/v) or less, 18% (w/v) or less, 17% (w/v) or less, 16% (w/v) or less, 15% (w/v) or less, 14% (w/v) or less, 13% (w/v) or less, 12% (w/v) or less, 11% (w/v) or less, 10% (w/v) or less, 9% (w/v) or less, 8% (w/v) or less, 7% (w/v) or less, 6% (w/v) or less, 5% (w/v) or less, 4% (w/v) or less, 3% (w/v) or less, 2% (w/v) or less, 1% (w/v) or less, or the like).

The ice used for the cold storage unit according to the present invention is suitable for use as a refrigerant to cool the cold storage object, since it has an excellent cooling capacity. Examples of a low-temperature refrigerant may include an organic solvent to be used as an anti-freezing solution such as ethanol in addition to ice, but the ice has a higher thermal conductivity and a higher specific heat than these anti-freezing solutions. For this reason, an ice having a lowered solidifying point arising from dissolution of a solute such as the ice used for the cold storage unit according to the present invention is useful also from the viewpoint of having a cooling capacity superior to other refrigerants at temperatures lower than 0° C. such as an anti-freezing solution.

The ice used for the cold storage unit according to the present invention may or may not include components other than the above-described solute.

In the present invention, the term "ice" refers to one acquired by freezing a liquid including an aqueous solution.

Also, the ice used for the cold storage unit according to the present invention is sustained in a stable state at a temperature equal to or lower than the solidifying point of fresh water, and thus the ice can be sustained in a non-separating state for a long time. For this reason, for example, in a case in which the liquid constituting the ice used for the cold storage unit according to the present invention is a liquid that further includes oil in addition to the aqueous solution including the solute, as will be described later, a state in which the oil is uniform lasts for a long time, and thus a non-separating state can be sustained for a long time.

As described above, the liquid constituting the ice used for the cold storage unit according to the present invention may be a liquid which further includes oil in addition to the aqueous solution including the solute described above. Examples of such a liquid may include raw milk, industrial waste including water and oil (such as waste milk). It is preferable that the liquid is raw milk from the viewpoint that the functionality when eating the ice is improved. It is presumed that the reason for improved functionality is that the oil (fat) included in the raw milk is confined in the ice. Incidentally, the ice used for the cold storage unit according to the present invention may be constituted only by ice obtained by freezing the aqueous solution including the solute described above.

In a case in which the liquid constituting the ice used for the cold storage unit according to the present invention further includes oil, the ratio of water and oil in the liquid is not particularly limited, and is selected as appropriate in a range of, for example, 1:99 to 99:1 (10:90 to 90:10, 20:80 to 80:20, 30:70 to 70:30, 40:60 to 60:40, or the like).

In addition, the ice used for the cold storage unit according to the present invention may be an ice from an aqueous solution including two or more types of solutes each having a different degree of solidifying point depression. In this case, the ice used for the cold storage unit according to the present invention may be a mixture of ice from an aqueous solution including one solute and ice from an aqueous solution including the other solute. In this case, for example, if ice from an aqueous solution including ethylene glycol as a solute is added to ice from an aqueous solution including salt as a solute having a degree of solidifying point depression different to that of ethylene glycol, it is possible to delay the melting of the ice from the aqueous solution including ethylene glycol. Alternatively, the ice used for the cold storage unit according to the present invention may be ice from an aqueous solution prepared by dissolving two or more types of solutes in the same aqueous solution. In addition, to concurrently use two or more types of solutes each having a different degree of solidifying point depression is also useful to decrease the melting point of ice from an aqueous solution including a solute to be the target. For example, in the case of using common salt as a solute, it is possible to decrease the melting point of ice formed from saline solution by concurrently using a solute (ethylene glycol, calcium chloride, or the like) which can decrease the melting point further than common salt, and for example, it is possible to realize a temperature in the vicinity of −30° C., which cannot be realized only by ice formed from saline solution. The ratio of two or more types of solutes each having a different degree of solidifying point depression can be changed as appropriate according to a purpose.

(Refrigerant to Cool Cold Storage Object (Also Referred to as "Ice Slurry"))

The present invention includes a refrigerant, including the above-described ice, to cool the cold storage object. As described above, the ice used for the cold storage unit according to the present invention is suitable for a refrigerant to cool a cold storage object, since it has an excellent cooling capacity.

The ice slurry may include a component other than the above-described ice. For example, the ice slurry may be constituted by a mixture of ice and water by including water in addition to the above-described ice. In a case in which the ice slurry further includes water including the same solute as the solute included in the ice, the solute concentration of the ice is preferably close to the solute concentration of the water, the reason for which is as follows.

In a case in which the solute concentration of the ice is higher than the solute concentration of the water, the temperature of the ice is lower than the saturated freezing point of the water, and thus the moisture freezes immediately after the water having a lower solute concentration is mixed with the ice. On the other hand, in a case in which the solute concentration of the ice is lower than the solute concentration of the water, the saturated freezing point of the water is lower than the saturated freezing point of the ice and thus the ice melts and the temperature of the refrigerant composed of the mixture of ice and water decreases. This means that, in order not to change the state of the mixture of ice and water (state of ice slurry), as described above, it is preferable to set the solute concentrations of ice and water to be mixed to be about the same. In addition, in a case in which the refrigerant is in the state of a mixture of ice and water, the water may be one generated as the ice melts or one separately prepared, but the water is preferably one generated as the ice melts.

Specifically, in the case of constituting the ice slurry by a mixture of ice and water, the ratio of the solute concentration in the ice and the solute concentration in the water is more preferably 75:25 to 20:80, still more preferably 70:30 to 30:70, yet more preferably 60:40 to 40:60, yet still more preferably 55:45 to 45:55, particularly preferably 52:48 to 48:52, and most preferably 50:50. Particularly in the case of using common salt as the solute, it is preferable that the ratio of the concentration of the solute in ice to the concentration of the solute in water is in the above range.

Water to be a raw material of the ice used for the cold storage unit according to the present invention is not particularly limited, but it is preferable that the ice is an ice from seawater, water prepared by adding salt to seawater, or diluted seawater in the case of using a common salt as the solute. Procuration of seawater, water prepared by adding salt to seawater, or diluted seawater is easy, thereby enabling cost reduction.

Although the ice slurry may or may not further include a solid having a thermal conductivity higher than that of the ice used for the cold storage unit according to the present invention, it is preferable to further include the solid. It is possible to achieve quick cooling of a target of cooling in a short time by utilizing a solid having a high thermal conductivity, but in this case, the solid itself also loses cold energy in a short time and the temperature thereof is likely to increase and the solid is thus unsuitable for long-term cooling. Meanwhile, it is suitable not to utilize a solid having a high thermal conductivity for long-term cooling but it is unsuitable not to utilize the solid for quick cooling of a target of cooling. However, the ice used for the cold storage unit according to the present invention has a high cooling capacity as described above, and is thus useful from the viewpoint that long-term cooling is also possible while obtaining a quick cooling capacity by the solid having a high thermal conductivity. Examples of the solid having a thermal conductivity higher than that of the ice used for the cold storage unit according to the present invention may include metals (aluminum, silver, copper, gold, duralumin, antimony, cadmium, zinc, tin, bismuth, tungsten, titanium, iron, lead, nickel, platinum, magnesium, molybdenum, zirconium, beryllium, indium, niobium, chromium, cobalt, iridium, palladium), alloys (steel (carbon steel, chromium steel, nickel steel, chromium nickel steel, silicon steel, tungsten steel, manganese steel, and the like), nickel chrome alloy, aluminum bronze, gunmetal, brass, Manganin, nickel silver, constantan, solder, alumel, chromel, monel metal, platinum iridium, and the like), silicon, carbon, ceramics (alumina ceramics, forsterite ceramics, steatite ceramics, and the like), marble, brick (magnesia brick, Corhart brick, and the like), and the like each having a thermal conductivity higher than that of the ice used for the cold storage unit according to the present invention are employed. In addition, the solid having a thermal conductivity higher than that of the ice used for the cold storage unit according to the present invention is preferably a solid having a thermal conductivity of 2.3 W/m K or more (3 W/m K or more, 5 W/m K or more, 8 W/m K or more, or the like), more preferably a solid having a thermal conductivity of 10 W/m K or more (20 W/m K or more, 30 W/m K or more, 40 W/m K or more, or the like), still more preferably a solid having a thermal conductivity of 50 W/m K or more (60 W/m K or more, 75 W/m K or more, 90 W/m K or more, or the like), yet more preferably a solid having a thermal conductivity of 100 W/m K or more (125 W/m K or more, 150 W/m K or more, 175 W/m K or more, or the like), still yet more preferably a solid having a thermal conductivity of 200 W/m K or more (250 W/m K or more, 300 W/m K or more, 350 W/m K or more, or the like), particularly preferably a solid having a thermal conductivity of 400 W/m K or more (410 W/m K or more, or the like).

In a case in which the ice slurry used for the cold storage unit according to the present invention includes the above-described solid having a thermal conductivity higher than that of the ice used for the cold storage unit according to the present invention, the ice slurry is suitable for long-term cooling even when a large amount of the solid is included, as described above. For example, the ratio of the mass of the solid having a thermal conductivity higher than that of the ice used for the cold storage unit according to the present invention to the mass of the ice, which is included in the ice slurry, used for the cold storage unit according to the present invention (or a total mass of the liquid including the aqueous solution and the ice, which is included in the ice slurry, used for the cold storage unit according to the present invention) may be $1/100000$ or more ($1/50000$ or more, $1/10000$ or more, $1/5000$ or more, $1/1000$ or more, $1/500$ or more, $1/100$ or more, $1/50$ or more, $1/10$ or more, $1/5$ or more, $1/4$ or more, $1/3$ or more, $1/2$ or more, and the like).

The above-described solid according to the present invention may have any shape, but has preferably a particulate shape. In addition, the solid may be included in a state of being included inside the ice used for the cold storage unit according to the present invention or in a state of being included outside the ice, but the cooling capacity is higher when the solid is included in a state of being included outside the ice since the solid is likely to come into direct contact with the target of cooling. For this reason, it is preferable that the solid is included in a state of being included outside the ice. In addition, in a case in which the ice slurry includes the above-described solid, the ice may be produced in a state in which the solid is mixed with water to be a raw material of the ice in advance.

Hereinafter, a description will be given of an embodiment of the present invention with reference to the accompanying drawings.

[Cold Storage Unit 1]

FIG. 1 is a cross-sectional view showing a configuration of a cold storage unit 1 according to an embodiment of the present invention.

As shown in FIG. 1, the cold storage unit 1 is provided with a casing 4, a cold storage space 5, a partition wall 6, a heat insulator 7, and a heat insulating sheet 8.

The casing 4 is in a cuboid-like shape, and has a heat insulating structure. Also, inside of the casing 4, the partition wall 6 is disposed facing the casing 4 and surrounding the cold storage space 5. A method for configuring the casing 4 in the heat insulating structure is not particularly limited. In the present embodiment, the cold storage unit 1 has a double wall structure made of steel or FRP (Fiber-Reinforced Plastics) interposed by the heat insulator 7 in a gap between the double wall. A member to be employed as the heat insulator 7 is not particularly limited. Specifically, for example, urethane form, glass wool, vacuum insulation material, or the like may be employed. Here, the "vacuum insulation material" is intended to mean an insulator acquired by covering a porous core by a laminate film, reducing a pressure inside, and sealing the film.

The cold storage space 5 is a space formed by being surrounded by the partition wall 6 for housing a cold storage object. The partition wall 6 is a wall surrounding the cold storage space 5 for cooling the cold storage space 5 by itself being cooled by an ice slurry 3, which will be described later. The wall partition 6 is preferably configured by a material having a high thermal conductivity. More particularly, for example, metal such as aluminum or copper may be employed. As a result of this, it is possible to efficiently cool the cold storage space 5 of the cold storage unit 1.

Between the casing 4 and the partition wall 6, a gap 50 is provided. The gap 50 is filled with the ice slurry 3. By filling in the gap 50 with the ice slurry 3 formed using a brine that can maintain a required sub-zero temperature, it is possible to cool the cold storage space 5 down to the required sub-zero temperature.

Here, the "brine" is intended to mean a liquid including a liquid heat medium having a low freezing point. More particularly, for example, sodium chloride solution (salt water), magnesium chloride solution, ethylene glycol, or the like is included in the brine. Also, the "flake ice" is intended to mean a flake-like shaped ice acquired by freezing the brine so as to have a uniform concentration. The flake ice, having a large specific surface area, can rapidly cool the cold storage article. The flake ice acquired by freezing the brine can draw a large amount of latent heat from the surrounding when melting. During the melting, temperature does not rise. Accordingly, it is possible to cool the cold storage object for a long period of time. The ice slurry includes a mixture of the brine and the flake ice acquired by freezing the brine, and thus includes a sherbet-like shaped ice. The ice slurry can easily be filled in the gap 50 compared to a hard block-like shaped ice, and has a feature of hardly causing uneven cooling.

At an upper portion of a side surface of the casing 4, an ice slurry supply port 40 is provided that enables the ice slurry 3 to be supplied to the gap 50. Also, at a lower portion of the side surface of the casing 4, an ice slurry discharge port 41 is provided that enables the ice slurry 3 to be discharged from the gap 50. Further, the ice slurry supply port 40 is provided with an on-off valve 42, and the ice slurry discharge port is provided with an on-off valve 43. As a result of this, by means of a pump or the like, it is possible to fill the gap with the ice slurry via the supply port, and to discharge the melted ice slurry via the discharge port, thereby maintaining the ice slurry filled in the gap 50 in a state of having a high cooling capacity.

On an inner side wall surface abutting the heat insulator 7, the heat insulating sheet 8 is adhered for reflecting radiant heat. A method of reflecting radiant heat is not particularly limited. In the present embodiment, a method of attaching the heat insulating sheet 8 is employed. In this case, as the heat insulating sheet 8, for example, a multi-layered sheet may be employed, one layer of which being produced in a manner such that one side of an aluminum deposited membrane is reinforced with a film, and the other side is attached with a heat insulator such as woven fabric, expanded sheet, or the like. Although not shown, on a side surface portion of the cold storage unit 1, a heat insulating door is provided for carrying in and out the cold storage object. Although, in the present embodiment, only the inner side wall surface abutting the heat insulator 7 is adhered with the heat insulating sheet 8, in addition to the inner side wall surface abutting the heat insulator 7, an outer side wall surface abutting the heat insulator 7 may be adhered with the heat insulating sheet 8. As a result of this, the heat insulating sheets adhered to the inner wall surfaces of the double wall reflect radiant heat, and thus it becomes possible to prevent heat transmission to the cold storage space.

[Cold Storage Unit 2]

Although the cold storage unit 1 of FIG. 1 is configured such that the gap 50 is directly filled with the ice slurry 3, there is no particular limitation to this. The gap 50 may house an ice slurry storage in which the ice slurry 3 is filled.

Figure 2:
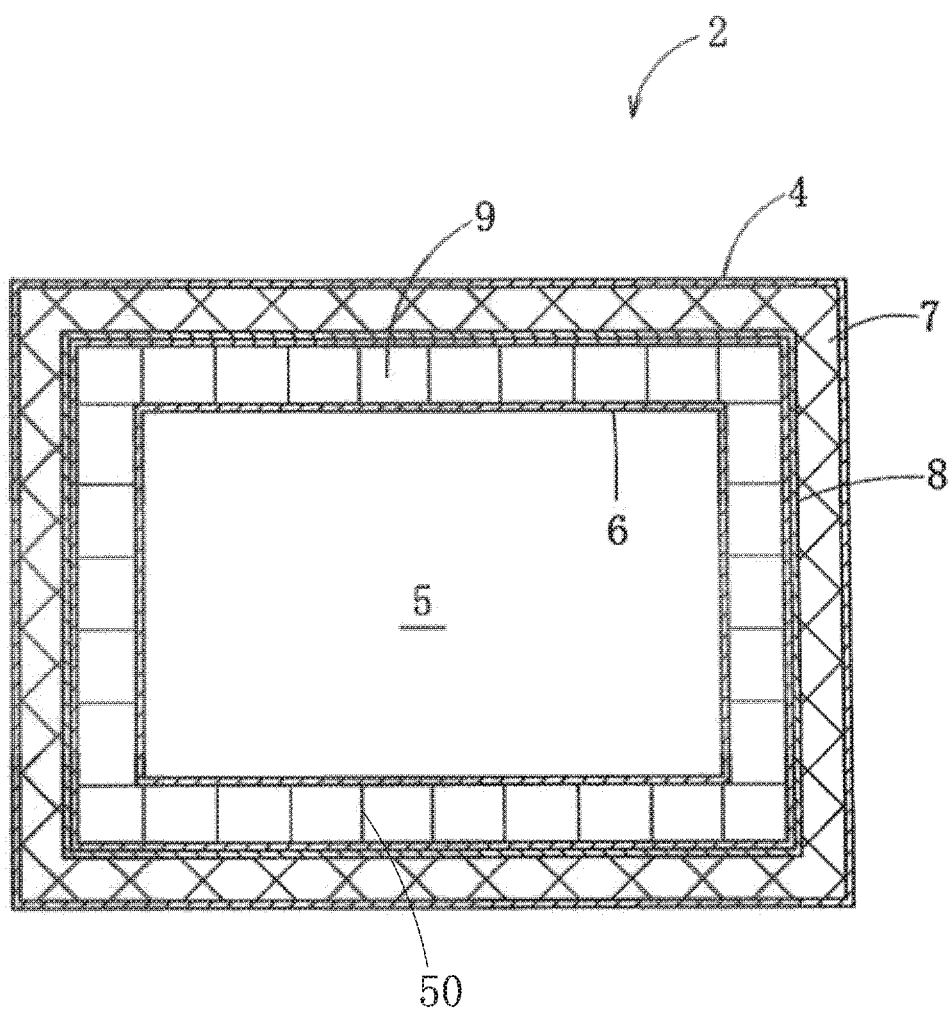
FIG. 2 is a cross-sectional view showing a configuration of a cold storage unit according to another embodiment of the present invention.

This means that, in place of filling the gap 50 with the ice slurry 3 using a pump or the like, a plurality of ice slurry storages 9, in which the ice slurry 3 is filled, may be placed in the gap 50. FIG. 2 is a cross-sectional view showing a configuration of a cold storage unit 2 according to another embodiment of the present invention. As shown in FIG. 2, in the cold storage unit 2, the plurality of the ice slurry storages 9, in which the ice slurry 3 is filled, are placed in the gap 50 between the casing 4 and the partition wall 6. Although a shape and material of the ice slurry storage 9 are not particularly limited, the ice slurry storage 9 is preferably formed in a shape such that it is easy to be placed in the gap 50 and with a material having a high thermal conductivity. In the cold storage unit 2 according to the present embodiment, as the ice slurry storage 9, a cylindrical airtight container formed by a metal having a high thermal conductivity and replaceable with the ice slurry 3 is employed. Although not shown, the partition wall 6 is provided with an open-close door for carrying the ice slurry storage 9 in the gap 50.

[Flake Ice Production Device]

It is impossible to generate the ice used for the cold storage unit according to the present invention even when a liquid that includes an aqueous solution and is in a state of being accumulated in a container is cooled from the outside. It is considered that this is due to insufficient cooling rate. However, a flake ice production device 10 according to an embodiment of the present invention enables an unprecedented rapid cooling in a manner such that a liquid including an aqueous solution including a solute is sprayed so as to be atomized and in direct contact with a wall surface maintained at a temperature equal to or lower than the solidifying point of the aqueous solution. It is considered that, as a result of this, the ice having a high cooling capacity that satisfies the above-described conditions (a) and (b) can be produced.

Examples of the wall surface may include an inner wall surface of a cylindrical structure such as a drum 11 in FIG. 3, which will be described later. However, the wall surface is not particularly limited as long as the wall surface can be kept to at a temperature equal to or lower than the solidifying point of the aqueous solution. The temperature of the wall surface is not particularly limited as long as it is kept at a temperature equal to or lower than the solidifying point of the aqueous solution, but it is preferable that the temperature is kept at a temperature lower than the solidifying point of the aqueous solution by 1° C. or more (2° C. or more, 3° C. or more, 4° C. or more, 5° C. or more, 6° C. or more, 7° C. or more, 8° C. or more, 9° C. or more, 10° C. or more, 11° C. or more, 12° C. or more, 13° C. or more, 14° C. or more, 15° C. or more, 16° C. or more, 17° C. or more, 18° C. or more, 19° C. or more, 20° C. or more, 21° C. or more, 22° C. or more, 23° C. or more, 24° C. or more, 25° C. or more, or the like) from the viewpoint of being able to produce an ice high purity including the ice that satisfies the conditions (a) and (b).

A method for spraying is not particularly limited, but it is possible to spray, for example, by injecting from an injection hole 13*a* provided to an injection unit such as an injection unit 13 in FIG. 3, which will be described later. In this case, a water pressure at the time of injection may be, for example, 0.001 MPa or more (0.002 MPa or more, 0.005 MPa or more, 0.01 MPa or more, 0.05 MPa or more, 0.1 MPa or more, 0.2 MPa or more, or the like) and may be 1 MPa or less (0.8 MPa or less, 0.7 MPa or less, 0.6 MPa or less, 0.5 MPa or less, 0.3 MPa or less, 0.1 MPa or less, 0.05 MPa or less, 0.01 MPa or less, or the like.

Figure 3:
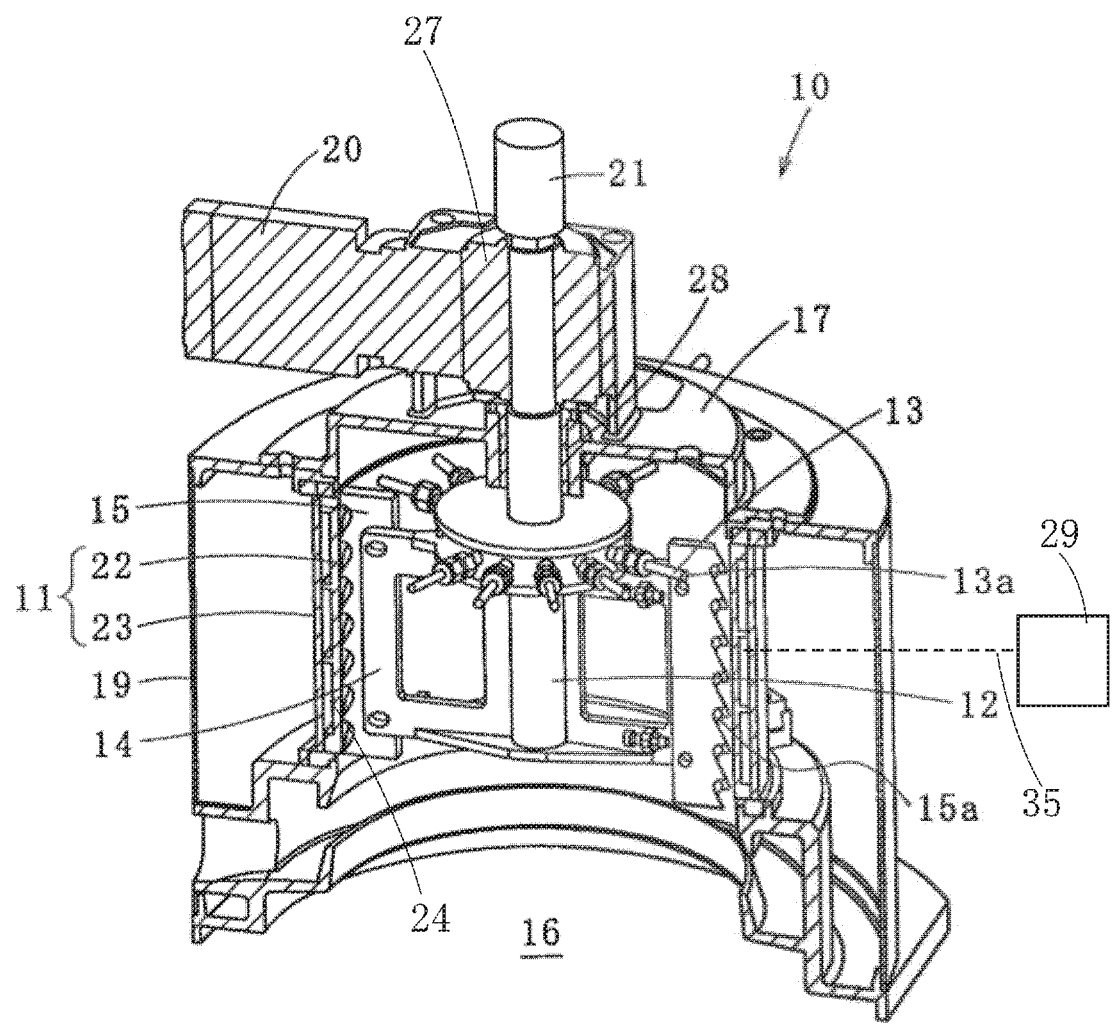
FIG. 3 is an image view including a partial cross-sectional perspective view showing an outline of a flake ice production device according to an embodiment of the present invention.

In addition, as shown in FIG. 3, which will be described later, spraying of the liquid may be conducted through continuous spraying in which a rotating means such as a rotatable rotary shaft 12 is provided on a central axis of the vertical drum 11 and spraying is conducted while rotating the rotating means.

(Collection Step)

After the above-described ice generating step, the present invention includes a step of collecting the ice generated on the wall surface.

A method for collecting is not particularly limited. For example, the ice on the wall surface may be scraped off by means of a unit such as a blade 15 as shown in FIG. 3, which will be described later, and the ice which has fallen may be collected.

Incidentally, when the ice is produced, ice-making heat is generated, but there is a possibility that an actual melting completion temperature is affected as the ice exposed to this ice-making heat. Therefore, it is considered that the melting completion temperature is affected by, not only the type and concentration of the solute, but also the ice-making heat. Accordingly, it is possible to adjust the actual melting completion temperature, by adjusting the amount of the ice-making heat remaining in the ice. It is possible to adjust the ice-making heat by adjusting the retention time of the ice on the wall surface in the collection step according to the present invention.

FIG. 3 is an image view including a partial cross-sectional perspective view showing an outline of a flake ice production device 10 according to an embodiment of the present invention.

As shown in FIG. 3, the flake ice production device 10 includes the drum 11, the rotary shaft 12, and the injection unit 13, a scraping unit 14, the blade 15, a flake ice discharge port 16, an upper bearing member 17, a heat insulating protective cover 19, a geared motor 20, a rotary joint 21, a refrigerant clearance 24, a bush 28, a refrigerant supply unit 29, and a rotation control unit 27. The drum 11 is configured by an inner cylinder 22, an outer cylinder 23 which surrounds the inner cylinder 22, the refrigerant clearance 24 formed between the inner cylinder 22 and the outer cylinder 23. An outer peripheral surface of the drum 11 is covered by the heat insulating protective cover 19 in a cylindrical shape. Although material of the inner cylinder 22 and the outer cylinder 23 is not particularly limited, steel is employed in the present embodiment. To the refrigerant clearance 24, a refrigerant is supplied via a refrigerant tube 35 from the refrigerant supply unit 29, thereby cooling an inner peripheral surface of the inner cylinder 22.

The rotary shaft 12 is disposed on the central axis of the drum 11 and rotates around the material axis by taking the central axis as the axis and using the geared motor 20 installed above the upper bearing member 17 as a power source. A rotation rate of the geared motor 20 is controlled by the rotation control unit 27, which will be described later. In addition, the rotary joint 21 is attached to the top portion of the rotary shaft 12. On an upper portion of the rotary shaft 12, a vertical hole 12*a* is formed, extending in the material axis direction in communication with each pipe of the injection unit 13 (see FIG. 4).

The injection unit 13 is constituted by a plurality of pipes each provided at a tip portion with an injection hole 13*a* for injecting the brine toward the inner peripheral surface of the inner cylinder 22, and rotates together with the rotary shaft 12. The brine injected through the injection hole 13*a* adheres to the inner peripheral surface of the inner cylinder 22, which has been cooled by the refrigerant, and is quickly frozen without being provided with time for separation. The plurality of pipes constituting the injection unit 13 radially extend from the rotary shaft 12 in a radial direction of the drum 11. Although installation height of each pipe is not particularly limited, in the present embodiment, each pipe is installed at an upper position of a height of the inner cylinder 22 of the drum 11. Incidentally, a spray nozzle or the like may be employed in place of the pipe.

The scraping unit 14 is constituted by a plurality of arms each equipped at a tip portion with the blade 15 adapted to scrape off the brine adhered in a frozen state to the inner peripheral surface of the drum 11. The scraping unit 14 extends in the radial direction of the drum 11, and rotates together with the rotary shaft 12. The plurality of arms constituting the scraping unit 14 are mounted so as to be symmetrical with respect to the rotary shaft 12. Although a number of arms is not particularly limited, in the present embodiment, the number of arms is set to two. Size and material of the blade 15 mounted on the tip portion of each arm are not particularly limited as long as the blade can scrape off the frozen brine. In the present embodiment, each blade 15 is made of stainless steel plate material having a length approximately equal to the entire length (entire height) of the inner cylinder 22, and formed on an end surface facing the inner cylinder 22 with a plurality of serrations 15*a*. Flake ice is obtained as the frozen brine is scraped off by the blade 15, and the flake ice falls through the flake ice discharge port 16. The flake ice fallen through the flake ice discharge port 16 is stored in a flake ice storage tank 34 (FIG. 4) disposed immediately below the flake ice production device 10.

The upper bearing member 17 having the shape of a pot, is inverted and seals the upper surface of the drum 11. The bush 24 for supporting the rotary shaft 12 is fitted at the central portion of the upper bearing member 17. The rotary shaft 12 is supported only by the upper bearing member 17, and a lower end of the rotary shaft 12 is not pivotally supported. This means that, there is no obstacle at the lower place of the drum 11 for the flake ice scraped by the blade 15 to fall down, and thus the lower plane of the drum 11 serves as a flake ice discharge port 16 for discharging the flake ice. The refrigerant supply unit 29 supplies to the refrigerant clearance 24 the refrigerant for cooling the inner peripheral surface of the inner cylinder 22 via the refrigerant tube 35. The refrigerant to be supplied by the refrigerant supply unit 29 is not particularly limited as long as being able to cool the inner peripheral surface of the inner cylinder 22. Specifically, for example, LNG (Liquefied Natural Gas) can be employed as the refrigerant. In the present embodiment, the refrigerant to be supplied to the refrigerant clearance 24 can be circulated between the refrigerant clearance 24 and the refrigerant supply unit 29 via the refrigerant tube 35. As a result of this, it is possible to maintain the refrigerant supplied to the refrigerant clearance 24 in a state of having a high cooling function. The rotation control unit 27 adjusts the rotation rate of the geared motor 20, thereby adjusting a rotation rate of the injection unit 13 and the scraping unit 14 rotating together with the rotary shaft 12. A method for the rotation control unit 27 to control the rotation rate is not particularly limited. Specifically, for example, a control method using an inverter may be employed.

[Flake Ice Production System]

Figure 4:
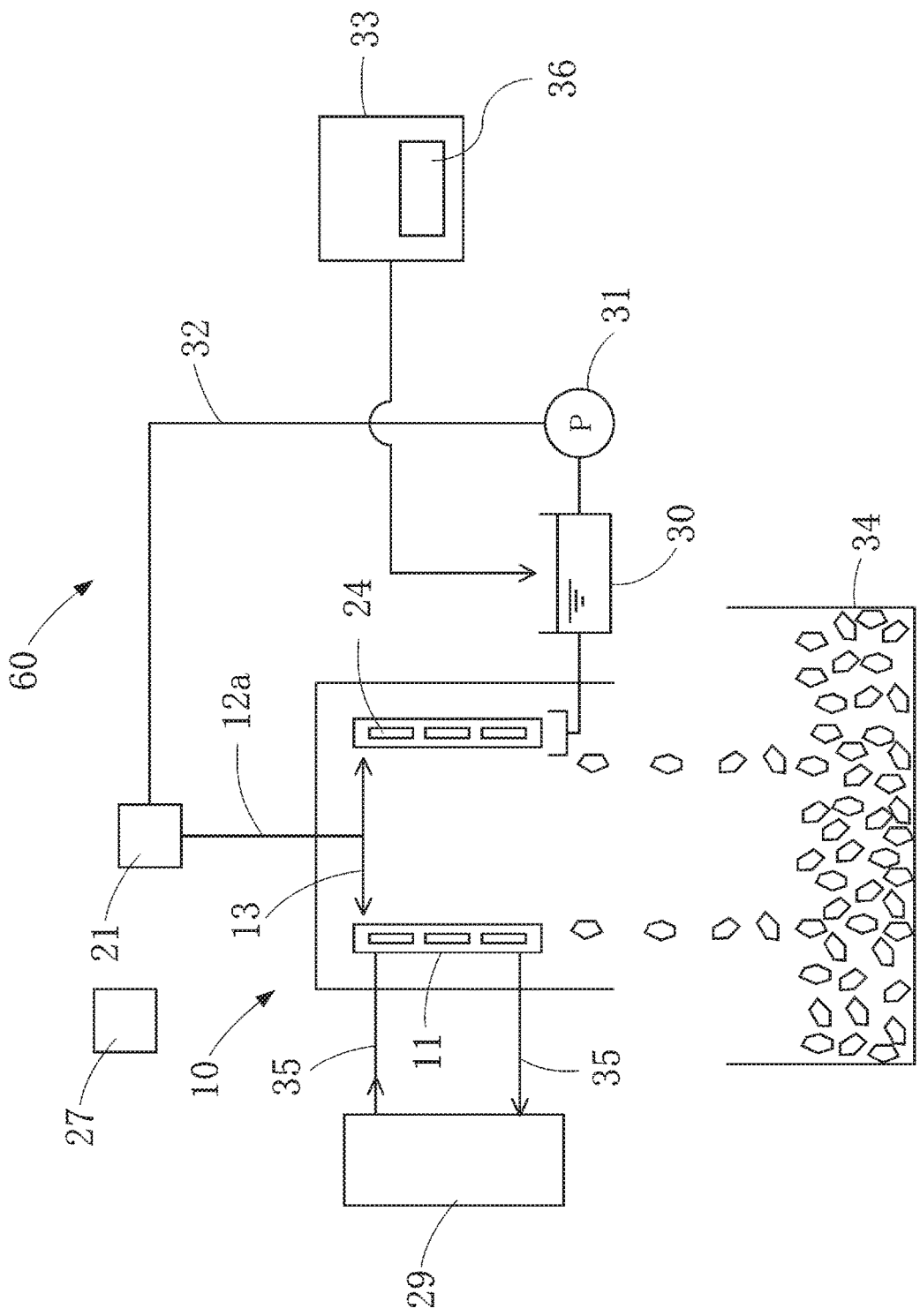
FIG. 4 is an image view showing an outline of an entire flake ice production system including the flake ice production device of FIG. 3.

FIG. 4 is an image view showing an outline of an entire flake ice production system 60 including the flake ice production device 10 of FIG. 3.

The flake ice production system 60 is provided with the flake ice production device 10, a brine storage tank 30, a pump 31, a brine tube 32, a brine tank 33, the flake ice storage tank 34, the refrigerant tube 35, and a freezing point adjusting unit 36. The brine storage tank 30 stores the brine to be raw material of the flake ice. The brine stored in the brine storage tank 30 is fed to the rotary joint 21 via the brine tube 32 by operating the pump 31, and becomes the flake ice by the flake ice production device 10. This means that, the brine fed to the rotary joint 21 is fed to the vertical hole 12*a* formed in the rotary shaft 12 and the rotary joint 21, and further fed from the vertical hole 12*a* to each pipe constituting the injection unit 13.

The brine tank 33 supplies the brine to the brine storage tank 30 in a case in which the brine in the brine storage tank 30 has decreased. Incidentally, the brine which has not been frozen on the inner peripheral surface of the inner cylinder 22 but has flowed down is stored in the brine storage tank 30 and is again fed to the rotary joint 21 via the brine tube 32 by operating the pump 31. The flake ice storage tank 34 is disposed immediately below the flake ice production device 10 and stores flake ice which has fallen through the flake ice discharge port 16 of the flake ice production device 10.

The freezing point adjusting unit 36 adjusts the freezing point of the brine to be supplied to the brine storage tank 30 from the brine tank 33. For example, in a case in which the brine is salt water, since the freezing point of the salt water varies depending on the concentration, the freezing point adjusting unit 36 adjusts the concentration of the salt water stored in the brine storage tank 30. A method for adjusting the freezing point of the brine is not particularly limited thereto. For example, it is also possible to employ the following method. That is, there are provided a plurality of brine storage tanks 30, and a plurality of types of brine each having a different freezing point are stored in respective brine storage tanks 30. Thereafter, the brine freezing point adjusting unit 36 selects a predetermined type of brine based on a required temperature of the flake ice (for example, a cooling temperature required for a conveyed article to be conveyed by the flake ice) and supplies the brine to the flake ice production device 10. Thus, by adjusting the freezing point of the brine, it is possible to adjust the temperature of the flake ice to be produced.

In the following, on a premise that the brine is salt water, a description will be given of the operation of the flake ice production system 60 including the flake ice production device 10 having the above-described configuration. First, the refrigerant supply unit 29 supplies the refrigerant to the refrigerant clearance 24 and sets the temperature of the inner peripheral surface of the inner cylinder 22 to be lower than the freezing point of salt water by approximately −10° C. This makes it possible to freeze the salt water adhered to the inner peripheral surface of the inner cylinder 22. When the inner peripheral surface of the inner cylinder 22 is cooled, the rotation control unit 27 drives the geared motor 20 so as to rotate the rotary shaft 12 around the material axis. When the rotary shaft 12 rotates, the pump 31 supplies salt water, which is brine, from the brine storage tank 30 to the rotary shaft 12 via the rotary joint 21. When the salt water is supplied into the rotary shaft 12, the injection unit 13 rotating together with the rotary shaft 12 injects the salt water toward the inner peripheral surface of the inner cylinder 22. The salt water injected from the injection unit 13, on contacting the inner peripheral surface of the inner cylinder 22, instantly freezes to ice. At this time, the rotation control unit 27 controls the rotation rate of the rotary shaft 12 so as to be 2 to 4 rpm. Incidentally, in a case in which a spray nozzle is employed in place of the pipe as a constituent of the injection unit 13, the rotation control unit 27 controls the rotation rate of the rotary shaft 12 so as to be 10 to 15 rpm. The ice generated on the inner peripheral surface of the inner cylinder 22 is scraped off by the scraping unit 14 rotating together with the rotary shaft 12. The ice scraped by the scraping unit 14 falls through the flake ice discharge port 16 as the flake ice. The flake ice which has fallen through the flake ice discharge port 16 is stored in the flake ice storage tank 34 disposed immediately below the flake ice production device 10. As described above, the salt water which has not converted to ice but has flowed down on the inner peripheral surface of the inner cylinder 22 is stored in the brine storage tank 30, and is fed again via the brine tube 32 to the rotary joint 21 by operating the pump 31. In a case in which the salt water in the brine storage tank 30 has decreased, the brine tank 33 supplies the salt water stored in itself to the brine storage tank 30.

Here, the rotation control unit 27 can change the temperature of the flake ice produced by the flake ice production device 10 by changing the rotation rate of the geared motor 20. For example, it is assumed that salt water is employed as the brine. In this case, it has been hitherto considered that the freezing point at which the salt water freezes depends on the solute concentration thereof alone. For example, if the solute concentration is 0.8%, it has been hitherto considered that the salt water freezes at −1.2° C. in any case. However, when the applicant of the present invention, employing salt water as the brine, changed the rotation rate of the rotary shaft 12 using the flake ice production device 10 according to the present embodiment, the applicant of the present invention discovered that the temperature of the flake ice to be produced from salt water of the same concentration changes depending on the rotation rate, and particularly, the temperature decreases when the rotation rate decreases. The reason for this is because a state of the flake ice storing the ice-making heat is maintained until completion of melting. Thus, it is possible to adjust the temperature of flake ice, while fixing the concentration of brine to a desired value according to targets of refrigeration and freezing.

[Ice Slurry Production Method]

In the following, a description will be given of an example of a method for producing ice slurry from the above-described brine and flake ice. It is possible to produce the ice slurry 3 meeting requirements of cold storage temperature and cold storage time by using as material a plurality of types of brine, which have been prepared in advance. Incidentally, the method is described on the assumption that the brine is salt water, and the cold storage object is a fresh marine product, and also, the fresh marine product, which is the cold storage object, is instantaneously frozen by being directly placed in the ice slurry 3 without using the cold storage unit 1 or the cold storage unit 2 described above.

In order to instantaneously freeze the fresh marine product, the solute concentration in the salt water, which is the raw material of the ice slurry, is greatly increased as compared to the conventional one. The theoretical saturated freezing point of salt water having a solute concentration of 13.6% is −9.8° C., and the theoretical saturated freezing point of salt water having a solute concentration of 23.1% is −21.2° C. In a case in which the solute concentration of salt water is less than 13.6%, the freezing speed of the fresh marine product by the produced ice slurry 3 slows down. On the other hand, in a case in which the solute concentration in salt water exceeds 23.1%, the salt precipitates as a crystal and thus the saturated freezing point of salt water increases. Incidentally, when the fresh marine product is directly immersed in the ice slurry 3, since a surface of the fresh marine product is instantaneously frozen and icebound, even if the solute concentration of the ice slurry is high, salt does not intrude into the fresh marine product.

The solute concentrations of the flake ice and the salt water, which are to be mixed for producing the ice slurry, are preferably close (within the difference of a few %) to each other. If the solute concentration of the flake ice is higher than that of the salt water, since a temperature of the flake ice is lower than the saturation freezing point of the salt water, immediately after adding the salt water having a lower solute concentration, the water component thereof freezes. On the other hand, if the solute concentration of the flake ice is lower than that of the salt water, since the saturation freezing point of the salt water is lower than that of the flake ice, the flake ice melts and the temperature of the ice slurry 3 is lowered. Consequently, in order not to change the state of the ice slurry 3, it is preferable to set the solute concentrations in flake ice and salt water to be mixed to be about the same.

A mass ratio of the flake ice and the salt water to be mixed is 75:25 to 20:80 (flake ice:salt water), preferably 60:40 to 50:50 (flake ice:salt water). If the mass ratio of the flake ice exceeds 75 mass %, due to a high solid component ratio, gaps are formed between the fresh marine product and the ice slurry 3, and the ice slurry 3 does not come into close contact with the fresh marine product. On the other hand, if the mass ratio of the flake ice is below 20 mass %, it is difficult to instantaneously freeze the fresh marine product with the produced ice slurry.

Therefore, in a case in which the brine is salt water, ice slurry is produced by mixing a flake ice produced by the flake ice production device 10 using salt water having a solute concentration (concentration of brine) of 13.6% to 23.1% and salt water having a solute concentration of 13.6% to 23.1%. In the present embodiment, the temperature of the produced ice slurry is set to −9.8° C. to −21.2° C. The temperature of the salt water to be mixed with the produced flake ice is set to ambient temperature or a temperature lower than ambient temperature. As the temperature of the salt water decreases, an ice making efficiency increases.

In a case in which the brine is other than salt water, a concentration of brine and a mass ratio of flake ice and brine to be mixed are adjusted so that the temperature of the ice slurry to be produced should be a required temperature. Thus, by adjusting the concentration of brine and the mass ratio of flake ice and brine to be mixed, it is possible to produce a plurality of types of ice slurries each having a different temperature.

[Ice Slurry Supply System] and [Cold Storage Article Transport System]

Figure 5:
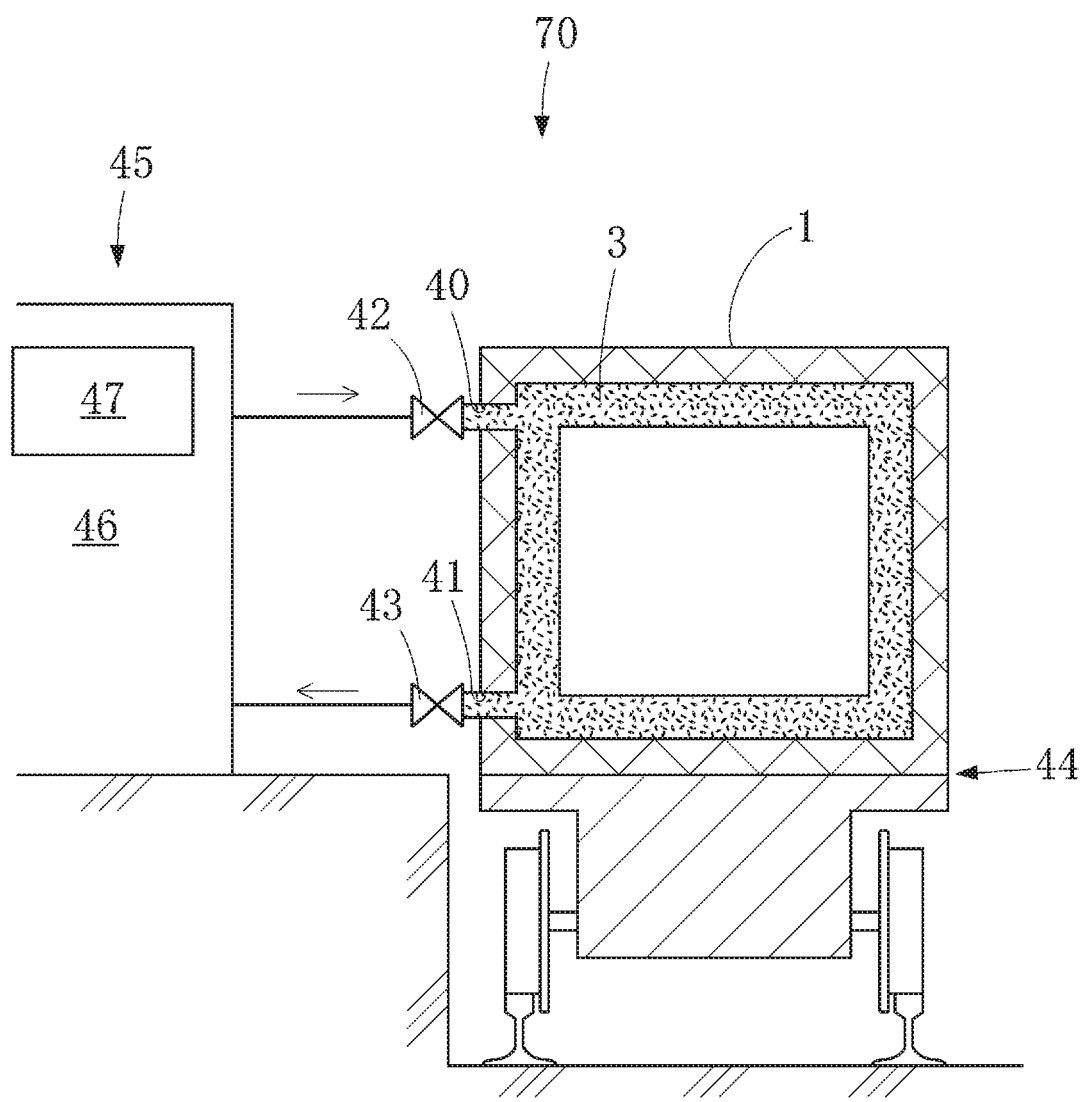
FIG. 5 is an image view showing an outline of an ice slurry supply system according to an embodiment of the present invention.

In the following, a description will be given of a method for supplying the ice slurry produced according to the above-described method to the cold storage unit 1, and a method for transporting a cold storage article utilizing the cold storage unit 1. FIG. 5 is an image view showing an outline of an ice slurry supply system according to an embodiment of the present invention.

As shown in FIG. 5, a cold storage moving body 44 according to the present embodiment is a freight train provided with the cold storage unit 1. The cold storage moving body 44 is not limited to a freight train and may be a cargo-carrying vehicle, a ship, or an aircraft. However, in a case of the freight train, it can be expected to have effects such as elimination of traffic jam by not using a car, $CO_2$ emission reduction by not emitting exhaust gas, improvement of transport efficiency, energy consumption saving, and the like. Since the cold storage space 5 is cooled by filling the ice slurry 3 in the gap 50 of the cold storage unit 1, it is possible to store and transport the cold storage object in the cold storage space 5 without need of electric power for cooling. Also, greenhouse gas such as carbon dioxide is not emitted unlike dry ice that sublimes to carbon dioxide. Further, it is possible to freeze and reuse the melted ice slurry as the source for cooling.

The cold storage unit 1 can have a cold storage temperature freely set independently of other cold storage units 1, and has no limitations on the temperature at a location to be installed. Accordingly, it is possible to load goods of different cold storage temperatures (goods including a plurality of cold storage units 1 having respective cold storage temperatures set independently) including goods of ambient temperature (goods carried without the cold storage unit 1) on a single cold storage moving body 44 or a single moving body of ambient temperature. Thus, it is possible to contribute to an efficient cargo-carrying. Further, as described above, in the cold storage unit 1, since it is possible to supply the ice slurry 3 via the ice slurry supply port 40 and to discharge the ice slurry 3 via the ice slurry discharge port 41, it is possible to replace the ice slurry 3 at a predetermined distribution base 45 equipped with an ice slurry supply apparatus 46, and to freely set a transit time by changing an amount of the ice slurry 3. Thus, long-distance transportation becomes possible, the distribution base 45 serving as a relaying point. Here, the "distribution base" is a distribution hub. In the present invention, a station, a gas station, a sea port, an airport, or the like where the cold storage moving body 44 such as a freight train, a truck, a ship, an aircraft stops is collectively referred to as a "distribution base".

At a distribution base 45 equipped with the ice slurry supply apparatus 46, the ice slurry 3 is produced by the ice slurry supply apparatus 46. The ice slurry 3 produced by the ice slurry supply apparatus 46 is supplied to the cold storage unit 1 by an ice slurry supply adjusting unit 47. This means that, the ice slurry 3 produced by the ice slurry supply apparatus 46 is supplied to the cold storage unit 1 provided to the cold storage moving body 44 via a pressure pipe and the ice slurry supply port 40 of the cold storage unit 1. Also, the ice slurry 3 that has been filled in the cold storage unit 1 is recovered by the ice slurry supply apparatus 46 via the ice slurry discharge port 41 of the cold storage unit 1. The ice slurry 3 recovered by the ice slurry supply apparatus 46 can be reused as raw material for producing the flake ice.

The ice slurry supply adjusting unit 47 adjusts a type and supply amount of the ice slurry 3 to be supplied to the cold storage unit 1 according to a cold storage temperature and a cold storage time of the cold storage unit 1. The ice slurry 3 has a different temperature depending on a type of the flake ice. Accordingly, the ice slurry supply adjusting unit 47 selects a suitable type of ice slurry from among a plurality of types of the ice slurry 3 each having a different temperature according to the cold storage temperature of the cold storage unit 1, and adjusts a fill amount of the ice slurry 3 to be suitable according to the cold storage time of the cold storage unit 1. In a case in which the brine is salt water, hitherto, in the ice obtained by freezing salt water, freezing begins from the part of fresh water having a higher freezing point, the part which is finally frozen is in a situation in which there is a part formed as a small amount of salt water is frozen and a salt precipitated is attached around the ice, and the solute concentration in the ice is nonuniform. Moreover, at the time of melting, the part which is finally frozen melts first and salt water having a high concentration of solute results, and thus the melted water has a technical problem that the solute concentration greatly changes in the melting process and the temperature increases toward 0° C.

However, the flake ice produced by the flake ice production device 10 is instantaneously frozen without being given the time for water and salt to separate. Thus, it becomes possible to acquire a flake ice having an approximately uniform solute concentration. Also, the solute concentration and the temperature from the start to end of melting stay approximately constant. Thus, it is possible to adjust a period of time to maintain the cold storage temperature in the cold storage unit 1 to a predetermined cold storage temperature as needed, by adjusting an amount of the ice slurry 3 in the cold storage unit 1. More particularly, it is possible to increase a maximum duration of cold storage by increasing the amount of the ice slurry 3 in the cold storage unit 1, and to decrease the maximum duration of cold storage by decreasing the amount of the ice slurry 3 in the cold storage unit 1. Accordingly, it is possible to adjust a fill amount of the ice slurry 3 according to the transit time of the cold storage object. Thus, it becomes possible to efficiently transport the cold storage object over a long distance under a suitable cooling environment.

In a case of the cold storage moving body 44 provided with the cold storage unit 2, it is possible to maintain a cooling state of the cold storage space 5 by replacing the ice slurry storage 9 accommodated in the cold storage unit 2 with another ice slurry storage 9 at the distribution base 45. In the cold storage unit 2, similarly to the cold storage unit 1, the ice slurry storage 9 suitable for the cold storage temperature of the cold storage unit 2 is selected from among a plurality of types of ice slurry storages 9, and a number of the ice slurry storage 9 is adjusted to be suitable for the cold storage time of the cold storage unit 2. Thus, it becomes possible to efficiently transport the cold storage object over a long distance under a suitable cooling environment.

Incidentally, it is also possible to transport a cold storage article being instantaneously frozen by directly placing the cold storage article into the ice slurry 3 without using the cold storage unit 1 or the cold storage unit 2 described above. More particularly, for example, a fresh marine product can be instantaneously frozen in the ice slurry 3, thereafter took out from the ice slurry 3, and cryopreserved at a temperature when instantaneously frozen or less. Thus, even after a long-time transportation to a remote place, the fresh marine product does not deteriorate in freshness and taste.

Figure 6:
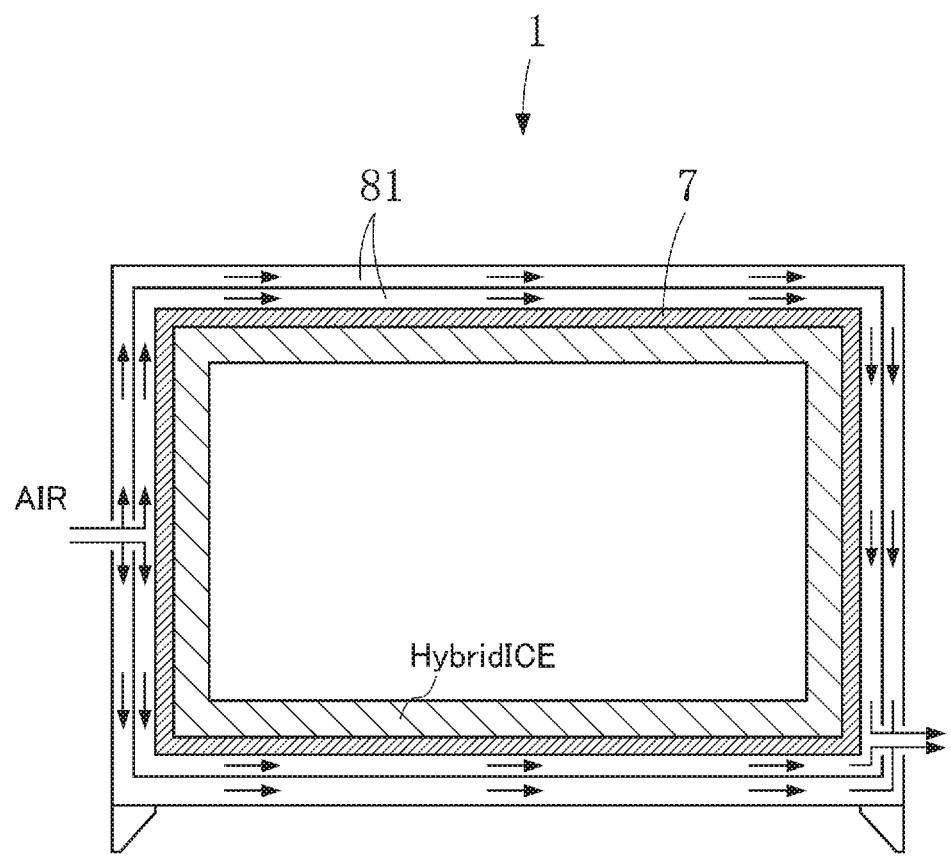
FIG. 6 is a diagram showing an example of a heat insulating structure of the cold storage unit of FIG. 1.

FIG. 6 is a diagram showing an example of a heat insulating structure of the cold storage unit 1 of FIG. 1.

As shown in FIG. 6, the casing 4 of the cold storage unit 1 is provided with a double wall outside of the insulator 7, and a blower clearance 81 is provided between the walls. Air is constantly blown in the blower clearance 81. Thus, it is possible to further improve the heat insulating effect of the cold storage unit 1. The cold storage unit 1 having a high heat insulating effect can be applied to various fields. Specifically, for example, the cold storage unit 1 can be applied to a refrigerator/freezer, a reefer container, a refrigerator/freezer truck, a cold box, a cooler box, and the like. By having the ice slurry supply apparatus 46 as a station, a versatile usage of the cold storage unit 1 becomes possible. The cold storage unit 1 does not need a freezer or a power generator, the brine (salt water) as the refrigerant is reusable, and the high heat insulating effect thereof enables long-distance transportation. Further, the cold storage unit 1 can accommodate a frozen transport, a cold transport, and an ordinary transport, and can contribute to energy saving and $CO_2$ reduction. Incidentally, the heat insulating structure shown in FIG. 6 can be applied to the cold storage unit 2 of FIG. 2 as well.

Embodiments of the present invention have been described above, but the present invention is not in any way limited to the configurations described in the above-mentioned embodiments, and the present invention also includes other embodiments and modifications that can be considered within the scope of the matters described in the claims. In addition, various modifications and combinations of the above-mentioned embodiments may be applied as long as they do not deviate from the gist of the present invention.

For example, in the above-described embodiments, the gap 50 has been provided on six surfaces inside of the casing 4. However, the gap 50 may be provided on only one surface (for example, a ceiling surface) inside of the casing to be filled with the ice slurry 3. Further, the shape of the cold storage unit 1 or the cold storage unit 2 is not limited to the cuboid-like shape as in the above-described embodiments. Further, the cold storage moving body 44 is not limited to a freight train, and may be a moving body such as a cargo-carrying vehicle including a car, a ship, and an aircraft. Further, in the above-described embodiments, the brine has been described to be salt water (sodium chloride aqueous solution). However, the brine is not particularly limited thereto. Specifically, for example, a calcium chloride aqueous solution, a magnesium chloride aqueous solution, ethylene glycol, and the like may be employed. Thus, it is possible to prepare a plurality of types of the brine each having a different freezing point according to a difference of a solute and concentration.

Further, the ice produced by the ice production device according to the present invention, although being desirable to be an ice from a liquid including an aqueous solution including a solute that satisfies the above described conditions (a) and (b), may be an ice that does not satisfy either or both of the conditions (a) and (b). This means that, ice slurry including ice and water each having a different solute concentration may be used to cool a cold storage object.

Also, if the above described ice slurry contains a solid having a thermal conductivity higher than that of the ice, in the process of cooling, the solid having a thermal conductivity higher than that of the ice is preferably interposed between the cold storage object and the ice included in the ice slurry. Thus, long-term cooling becomes possible, while having a quick cooling capacity in a short time due to the solid having the high thermal conductivity. In such a case, depending on purpose, another substance may be interposed among the ice, the solid having the thermal conductivity higher than that of the ice, and the cold storage object. For example, in a case in which the ice slurry includes a substance that is not preferable to directly contact the cold storage object (for example, a solid such as metal having a thermal conductivity higher than that of the ice or the like, which is not desirable to directly contact the cold storage object from a viewpoint of safety), the cold storage object may be cooled in a manner such that either one of the ice slurry and the cold storage object is confined in a bag so as to avoid the direct contact between the ice slurry and the cold storage object.

Summarizing the above, the cold storage unit, the moving body, the ice slurry supply system to which the present invention is applied can take various embodiments as long as it has the following configuration. In the cold storage unit (for example, the cold storage unit 1 of FIG. 1) to which the present invention is applied, a casing (for example, the casing 4 of FIG. 1) that defines a cold storage space (for example, the cold storage space 5 of FIG. 1) has a heat insulating structure, a partition wall (for example, the partition wall 6 of FIG. 1) that faces the casing is provided at least at a top portion of the cold storage space, and a gap (for example, the gap 50 of FIG. 1) between the casing and the partition wall is filled with an ice slurry (for example, the ice slurry 3 of FIG. 1) that is a mixture of brine (for example, salt water) and flake ice acquired by freezing the brine. As a result of this, it is possible to provide a cold storage unit that has a high cold storage capacity, does not generate carbon dioxide, and can recycle ice slurry as a source for cooling. Also, it is possible to easily transport a cold storage object to a remote place.

In addition, the ice slurry can include a solid such as metal having a thermal conductivity higher than that of the flake ice. As a result of this, it is possible to increase a cooling capacity.

In addition, the cold storage unit can include a supply port (for example, the ice slurry supply port 40 of FIG. 1) for supplying the ice slurry into the gap, and a discharge port (for example, the ice slurry discharge port 41 of FIG. 1). As a result of this, it is possible to reuse the ice slurry 3, which has been discharged from the ice slurry discharge port 41, as raw material to produce the flake ice.

In addition, the gap can house an ice slurry storage (for example, the ice slurry storage 9 of FIG. 2) filled with the ice slurry. As a result of this, it is possible to maintain a cold storage state of the cold storage space 5 by replacing the ice slurry storage 9 accommodated in the cold storage unit 2 with another ice slurry storage 9.

In addition, the casing can be formed as a double wall interposed with a heat insulator (for example, the heat insulator of FIG. 1), and a wall surface abutting the heat insulator can be adhered with a heat insulating sheet (for example, the heat insulating sheet 8 of FIG. 1).

In addition, the moving body (for example, the cold storage moving body 44 of FIG. 5) to which the present invention is applied can install a plurality of the cold storage units.

In addition, in the ice slurry supply system to which the present invention is applied, a distribution base can be provided with an ice slurry supply equipment (for example, the ice slurry supply apparatus 46 of FIG. 5) for supplying the ice slurry to the cold storage unit installed on the moving body.

In addition, the cold storage article transport system, to which the present invention is applied, can store and transport a cold storage article in the cold storage unit (for example, the cold storage unit 1 of FIG. 1) supplied with refrigerant (for example, the ice slurry 3 of FIG. 1) including flake ice acquired by freezing the brine, and can include, a freezing point adjusting unit (for example, the freezing point adjusting unit 36 of FIG. 4) for adjusting a freezing point of the brine based on a cold storage temperature required for the cold storage article, a flake ice production unit (for example, the flake ice production device 10 of FIG. 3) for producing the flake ice from the brine having the freezing point thereof being adjusted, and a supply amount adjusting unit (for example, the ice slurry supply adjusting unit 47 of FIG. 5) for adjusting a supply amount of the generated flake ice to the cold storage unit based on a transit time required for the cold storage article. As a result of this, it becomes possible to efficiently transport the cold storage object over a long distance under a suitable cooling environment.

In addition, the brine is salt water, and the freezing point adjusting unit can adjust the freezing point of the brine supplied to the flake ice production unit by adjusting a solute concentration of the salt water.

In addition, a plurality of types of the brine (for example, magnesium chloride aqueous solution, ethylene glycol, and the like) each having a different freezing point are prepared, and the freezing point adjusting unit can adjust the freezing point of the brine supplied to the flake ice production unit by selecting a predetermined type of the brine from among the plurality of types of the brine.

The refrigerant supplied to the cold storage unit can be an ice slurry (for example, the ice slurry 3 of FIG. 1) that is a mixture of the flake ice and the brine.

EXPLANATION OF REFERENCE NUMERALS 1, 2: Cold Storage Unit, 3: Ice Slurry, 4: Casing, 5: Cold Storage Space, 6: Partition Wall, 7: Heat Insulator, 8: Heat Insulating Sheet, 9: Ice Slurry Storage, 10: Flake Ice Production Device, 11: Drum, 12: Rotary Shaft, 12a: Vertical Hole, 13: Injection Unit 13a: Injection Hole, 14: Scraping Unit, 15: Blade, 15a: Serrations 16: Flake Ice Discharge Port, 17: Upper Bearing Member, 19: Heat Insulating Protective Cover, 20: Geared Motor, 21: Rotary Joint, 22: Inner Cylinder, 23: Outer Cylinder, 24: Refrigerant Clearance, 27: Rotation Control Unit, 28: Bush, 29: Refrigerant Supply Unit, 30: Brine Storage Tank, 31: Pump, 32: Brine Pipe, 33: Brine Tank, 34: Flake Ice Storage Tank, 35: Refrigerant Tube, 36: Freezing Point Adjusting Unit, 40: Ice Slurry Supply Port, 41: Ice Slurry Discharge Port, 42, 43: On-off Valve, 44: Cold Storage Moving Body, 45: Distribution Base, 46: Ice Slurry Supply Apparatus, 47: Ice Slurry Supply Adjusting Unit, 50: Gap, 60: Flake Ice Production System, 70: Ice Slurry Supply System, 81: Blower Clearance

The invention claimed is:

1. A cold storage unit comprising
a casing that defines a cold storage space has a heat insulating structure, a partition wall that faces the casing is provided at least at a top portion of the cold storage space, and
a gap between the casing and the partition wall is filled with an ice slurry that is a mixture of brine and flake ice acquired by freezing the brine,
wherein the ice slurry satisfies following conditions (a) and (b):
(a) a temperature upon complete melting of the ice is lower than 0° C., and
(b) a rate of change in solute concentration of an aqueous solution to be generated from the ice in melting process is 30% or less.

2. The cold storage unit according to claim 1 comprising:
a supply port for supplying the ice slurry into the gap, and
a discharge port for discharging the ice slurry from the gap.

3. The cold storage unit according to claim 1, wherein the gap houses an ice slurry storage filled with the ice slurry.

4. The cold storage unit according to claim 1, wherein the casing is formed as a double wall interposed with a heat insulator, and a wall surface abutting the heat insulator is adhered with a heat insulating sheet for reflecting radiant heat.

5. A cargo-carrying vehicle to which can be installed a plurality of cold storage units according to claim 1.

6. An ice slurry supply system comprising, a distribution base provided with an ice slurry supply apparatus comprising an ice slurry supply adjusting unit, and configured for supplying the ice slurry to the cold storage unit installed on the cargo-carrying vehicle according to claim 5.

7. A transport method for a cold storage article comprising, using the cargo-carrying vehicle according to claim 5 to transport the cold storage article.

8. A cold storage article transport system that stores and transports a cold storage article in the cold storage unit according to claim 1 supplied with refrigerant including flake ice acquired by freezing the brine, comprising:
a freezing point adjusting unit for adjusting a freezing point of the brine based on a cold storage temperature required for the cold storage article,
a flake ice production device for producing the flake ice from the brine having the freezing point thereof being adjusted, and
an ice slurry supply adjusting unit for adjusting a supply amount of the generated flake ice to the cold storage unit based on a transit time required for the cold storage article.

9. The cold storage article transport system according to claim 8, wherein the brine is salt water, and the freezing point adjusting unit adjusts the freezing point of the brine supplied to the flake ice production device by adjusting a solute concentration of the salt water.

10. The cold storage article transport system according to claim 8, wherein a plurality of types of the brine each having a different freezing point are prepared, and the freezing point adjusting unit adjusts the freezing point of the brine supplied to the flake ice production device by selecting a predetermined type of the brine from among the plurality of types of the brine.

11. The cold storage article transport system according to claim 8, wherein the refrigerant supplied to the cold storage unit is an ice slurry that is a mixture of the flake ice and the brine.

12. A transport method for a cold storage article comprising, using the cold storage article transport system according to claim 8 to transport the cold storage article.

13. A cold storage method for a cold storage article comprising, using the cold storage unit according to claim 1 to store the cold storage article.

* * * * *